(12) United States Patent
Sitterlet et al.

(10) Patent No.: US 8,992,199 B2
(45) Date of Patent: Mar. 31, 2015

(54) MOLDING APPARATUS WITH DYNAMIC SEAL

(71) Applicant: Pilkington Group Limited, Lathom (GB)

(72) Inventors: Charles Sitterlet, Northwood, OH (US); Robert Ronald Frutig, Perrysburg, OH (US)

(73) Assignee: Pilkington Group Limited, Lathom (GB)

( * ) Notice: Subject to any disclaimer, the term of this patent is extended or adjusted under 35 U.S.C. 154(b) by 0 days.

(21) Appl. No.: 14/308,925

(22) Filed: Jun. 19, 2014

(65) Prior Publication Data

US 2014/0342031 A1 Nov. 20, 2014

Related U.S. Application Data

(62) Division of application No. 13/138,051, filed as application No. PCT/US2010/000061 on Jan. 11, 2010, now Pat. No. 8,790,562.

(60) Provisional application No. 61/144,900, filed on Jan. 15, 2009.

(51) Int. Cl.
*B29C 45/14* (2006.01)
*B29K 709/08* (2006.01)

(52) U.S. Cl.
CPC ..... *B29C 45/14418* (2013.01); *B29C 45/14377* (2013.01); *B29C 45/14434* (2013.01); *B29K 2709/08* (2013.01); *B29C 2045/14459* (2013.01); *B29K 2809/00* (2013.01); *B29K 2883/00* (2013.01)

USPC ....... 425/127; 264/46.4; 264/271.1; 264/279; 264/252

(58) Field of Classification Search
CPC .................... B29C 45/14418; B29C 45/14434
USPC ............... 425/127; 264/46.4, 271.1, 279, 252
See application file for complete search history.

(56) References Cited

U.S. PATENT DOCUMENTS

| | | | |
|---|---|---|---|
| 4,561,625 A | 12/1985 | Weaver | |
| 4,584,155 A | 4/1986 | Zanella | |
| 4,606,159 A | 8/1986 | Kunert | |
| 4,688,752 A * | 8/1987 | Barteck et al. | 249/85 |
| 4,854,599 A | 8/1989 | Barteck | |
| 4,915,395 A | 4/1990 | Barteck | |
| 5,061,429 A | 10/1991 | Yoshihara | |
| 5,804,018 A | 9/1998 | Fisher | |
| 6,123,535 A | 9/2000 | Ash | |
| 6,461,137 B1 * | 10/2002 | Ash et al. | 425/127 |
| 6,495,082 B1 | 12/2002 | Ash | |
| 7,871,555 B2 | 1/2011 | Orten | |

FOREIGN PATENT DOCUMENTS

| | | |
|---|---|---|
| DE | 102006048413 A1 | 4/2008 |
| EP | 0354481 A2 | 2/1990 |
| JP | 63-162210 A | 7/1988 |
| WO | 98/05487 A1 | 2/1998 |

* cited by examiner

*Primary Examiner* — Joseph S Del Sole
*Assistant Examiner* — Lawrence D Hohenbrink, Jr.
(74) *Attorney, Agent, or Firm* — Marshall & Melhorn, LLC

(57) ABSTRACT

The invention relates to a dynamic mold seal for use in a molding apparatus to mold a polymeric frame or gasket onto the periphery of a glass sheet. The molding apparatus may be used to form a vehicle window.

8 Claims, 5 Drawing Sheets

MOLDING APPARATUS WITH DYNAMIC SEAL

BACKGROUND OF INVENTION

The invention relates to a mold seal which allows an improved method of molding a polymeric material onto at least a portion of the periphery of a sheet of substrate material. More particularly, the invention relates to utilizing the subject seal in a molding apparatus to mold a polymeric frame or gasket onto the periphery of a glass window for a vehicle.

It is known to mold an elastomeric gasket or frame member onto the periphery of a substrate such as glass to form products such as vehicle windows. Common molding methods are reaction injection molding (RIM) and injection molding. Such molded-on members have become increasingly complex and, as a result, the molding apparatus used in making such molded-on members have likewise become more complex.

To create the profiles desired in such elastomeric members, it is sometimes necessary to manage the flow of the polymeric molding material within the molding apparatus. Among the methods utilized for such management of liquid polymeric molding material are so-called "soft seals." In typical known soft seals, it is often necessary to have a soft seal in opposing relationship on each major surface of the substrate onto which the gasket is to be molded. Such seal configurations generally do not permit molding up to the edge of the major surface of the substrate, which can be a detriment, both aesthetically and functionally. Therefore, it would be desirable to have a method of molding requiring a single soft seal that would permit complex molded profiles extending to, and even beyond the edge of a major surface of the substrate.

SUMMARY OF THE INVENTION

The invention relates to a mold seal which allows, in a simple and cost-effective manner, an improved method of molding a polymeric material onto at least a portion of the periphery of a sheet of substrate material. More particularly, the invention relates to utilizing the subject seal in a molding apparatus to mold a polymeric frame or gasket onto the periphery of a glass window for a vehicle. Still more particularly, the invention relates to a dynamic mold seal which, working in cooperation with at least one movable mold portion, permits molding up to the edge of a major surface of a sheet of substrate material, or even beyond the edge of a major surface of a sheet of substrate material if desired.

The dynamic mold seal of the invention includes a base portion, an intermediate portion, a straight arm portion and a flexible arm portion. Preferably, the subject mold seal is an integral assembly including the previously mentioned elements. In any desired configuration, the intermediate portion extends from the base portion, and the straight and flexible arm portions extend from the intermediate portion, but in different directions from one another. The flexible arm is capable of movement due to the presence of an "elbow," allowing the flexible arm to move into and out of sealing contact with at least a portion of a peripheral edge of the sheet of substrate material. At the same time, the straight arm portion is adapted to sealingly engage at least a portion of a major surface of the substrate material.

The invention also relates in another aspect to the utilization of the previously described dynamic mold seal in a molding apparatus to form an encapsulated substrate, such as a vehicle window having a molded-on frame or gasket.

The molding apparatus in which the dynamic seal is utilized includes upper and lower mold halves, either or both of which may have a mold cavity formed therein. In a mold half containing a mold cavity, a seal cavity will also be formed to receive the base portion of the dynamic seal of the invention. At least one movable mold portion is also included in the mold half having the seal cavity. The at least one movable mold portion is located so that the flexible arm portion of the dynamic seal is within the range of movement of the movable mold portion.

In preparing to conduct a molding operation, the dynamic seal of the invention will have been affixed in the cavity seal. A sheet of substrate material, for example a glass vehicle window, will be placed in the mold cavity such that at least a portion of the peripheral edge of the vehicle window is proximate the dynamic seal of the invention. The straight arm portion of the seal is in sealing contact with a major surface of the vehicle window; that is, the inner major surface of the vehicle window. Closure of the mold halves actuates the movable mold portion, causing it to come into pressing contact with the flexible arm of the seal of the invention. The flexible arm is deflected toward, and into sealing contact with, at least a portion of the peripheral edge of the vehicle window. Then, liquid polymeric material is injected into the molding apparatus to fill the mold cavity. Due to the action of the seal of the invention, such liquid polymeric material is prevented from coming into molding contact with either of at least a portion of the peripheral edge of the vehicle window or a portion of the inner major surface of the vehicle window. A polymeric frame or gasket is formed, however, around the remaining portion of the periphery of the vehicle window.

The liquid polymeric material is allowed to cure in the mold cavity and thus bond to the at least a portion of the periphery of the vehicle window. Once sufficient curing has occurred, the mold halves are opened, and the movable portion of the mold retracts from its extended position, releasing the pressure exerted on the flexible arm of the subject seal. The flexible arm of the seal moves away from the periphery of the now-encapsulated vehicle window, which can be removed from the mold cavity.

BRIEF DESCRIPTION OF THE DRAWINGS

The advantages described herein, as well as other advantages of the present invention, will become readily apparent to those skilled in the art from the following detailed description of the preferred embodiment when considered in light of the accompanying drawings.

DETAILED DESCRIPTION OF THE INVENTION

Molding of an elastomeric frame or gasket onto the periphery of, for example, a vehicle window to form a so-called modular window assembly, which can then be conveniently installed in an opening in a vehicle body, is well known. Even so, placing a piece of glass into an injection molding apparatus and subjecting it to several thousand pounds per square inch of molding pressure in order to mold on the periphery thereof a polymeric frame or gasket without breaking the glass while obtaining a strong bond between glass and the polymeric frame or gasket, presents a number of technological challenges.

Figure 5:
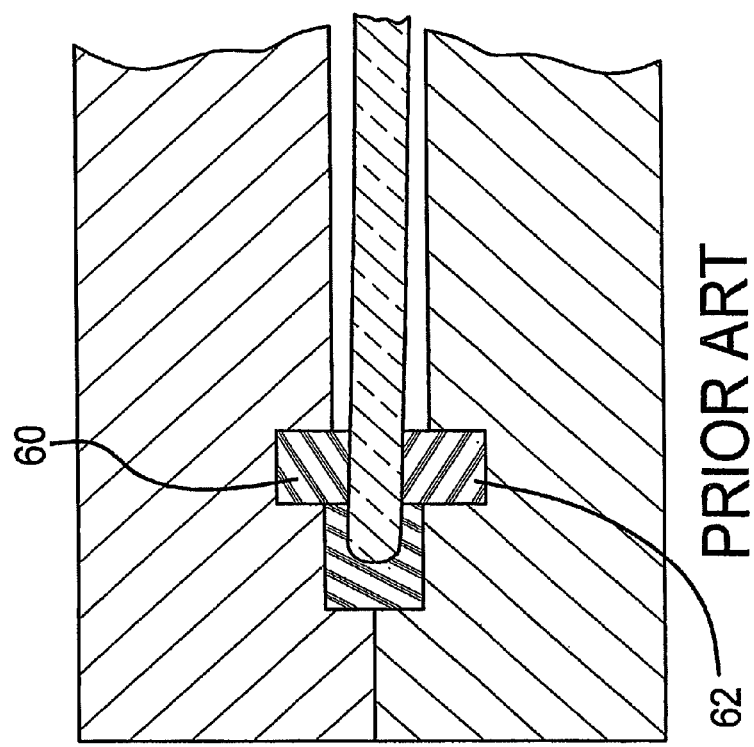
FIG. 5 is a cross-sectional view of a molding apparatus containing a soft seal typical of those known from the patent literature.

As previously noted, highly complex molding apparatus to create complex molding profiles have been proposed. Typically, such apparatus have one or more means of directing the liquid polymeric molding material to a particular area of the mold, or conversely, preventing the flow of the polymeric material into a particular portion of the mold. As previously noted, movable mold portions and so-called "soft seals" are among these means. An example of a typical known soft seal is illustrated in FIG. 5. The typical, previously known soft seal illustrated in FIG. 5 requires opposing seals 60 and 62. The soft seals shown in FIG. 5 do not allow molding up to or even over the edge of a vehicle window during a molding operation. Also, while typical soft seals allow for some variation in glass dimensions and configuration, they are, generally, quite limited in this regard. Typical soft seals are also susceptible to being dislodged from their position in the mold by the pressures in the mold created by the molding operation. This is particularly, an issue with injection molding processes.

The mold seal of the invention, by contrast, is relatively simple in that only a single seal is necessary, rather the two or more as shown in FIG. 5 herein, while allowing molding up to and beyond the peripheral edge of the glass sheet, as well as accommodating significant variations in glass size and shape during the molding process. Further, the cooperation between a movable mold portion and the present mold seal not only causes the effective functioning of the mold seal, by allowing it to move into and out of sealing engagement with the substrate, but the movable mold portion assists in preventing the mold seal from being dislodged from the mold cavity during the molding operation.

Figure 1:
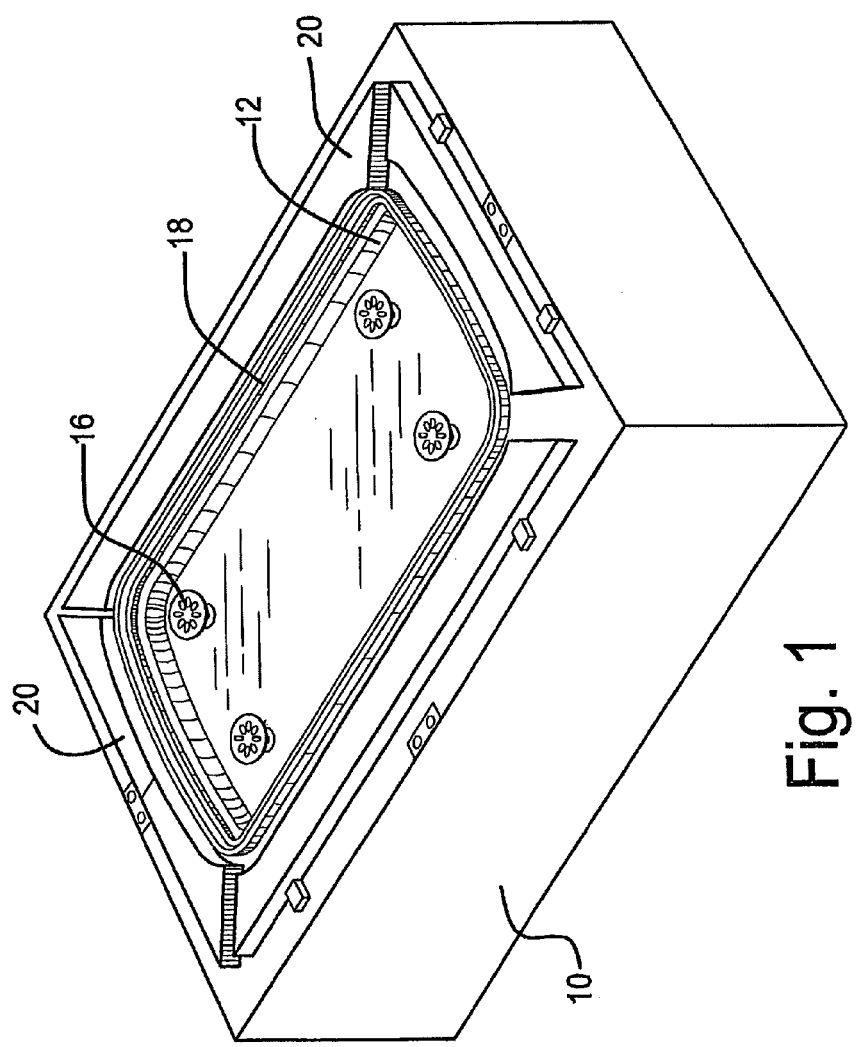
FIG. 1 is a perspective view of a lower mold half of the molding apparatus according to the invention.

FIG. 1 shows a mold half 10 of the invention having a mold cavity 12 which will receive the liquid polymeric molding material. One or more means of conveying the polymeric material (not shown) into the mold cavity 12 will be present, e.g. one or more sprues and a cold/hot runner system, but are well known and not part of the invention. When placed into the mold half 10, the glass sheet 14 will be supported by one or more resilient support members 16 proximate seal cavity 18 and within the range of movement of movable mold portion 20. As will be described in more detail, the base of mold seal 22 is configured to be insertable into seal cavity 18. Lower mold half 10 can be made of steel, aluminum or other suitable material.

Figure 2:
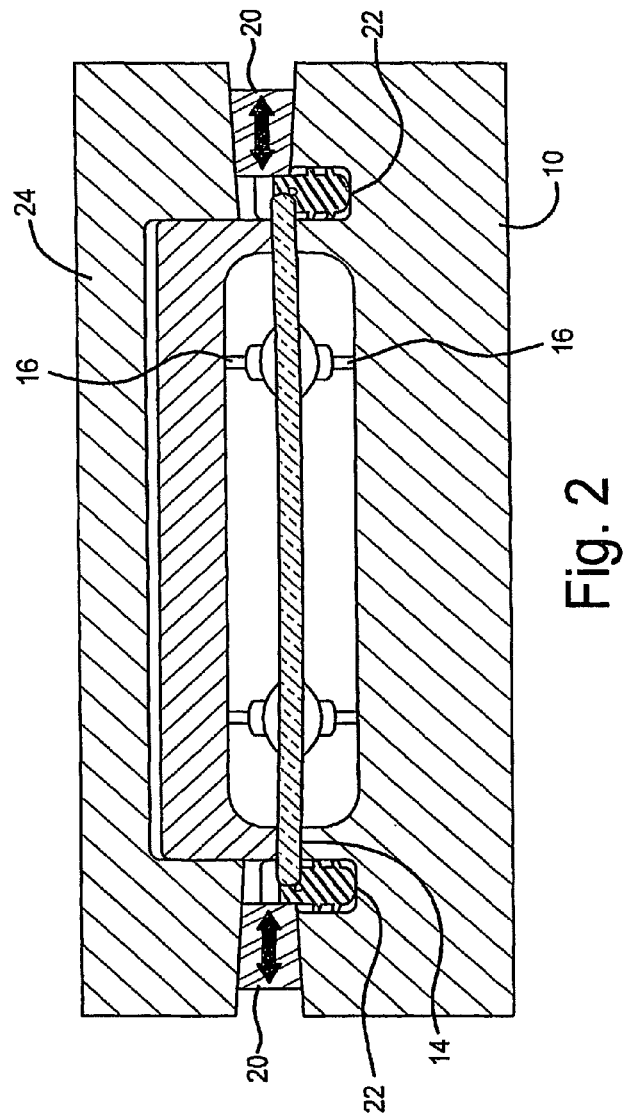
FIG. 2 is a cross-sectional view of the upper and lower mold halves in molding contact and containing the subject dynamic seal according to the invention.

FIG. 2 is a cross-sectional view of the lower mold half 10 of FIG. 1 in intimate molding contact with upper mold half 24. A glass sheet 14 is in the closed molding apparatus ready for the molding operation to occur. Similar to lower mold half 10, upper mold half 24 may be made from aluminum, steel or other suitable material.

Figure 3:
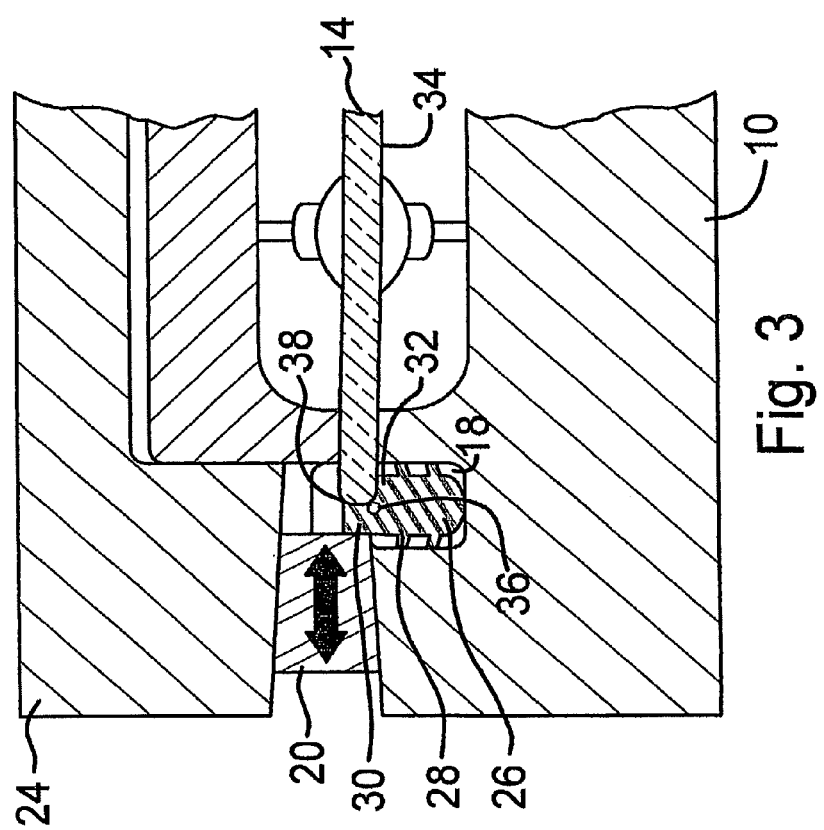
FIG. 3 is a cross-sectional detailed view of the molding apparatus according to the invention, particularly illustrating the movable mold portion interacting with the dynamic seal.

FIG. 3 shows the mold seal 22 of the invention as shown, generally, in FIG. 2 in greater detail. As can be seen, the mold seal 22 of the invention is comprised of a base portion 26 configured to be inserted into seal cavity 18, an intermediate seal portion 28 which connects the base portion 26 of the seal with the flexible arm 30, and straight arm 32. Mold seal 22 can be made from any suitable resilient polymeric material, for example, EPDM, silicone and thermoplastic elastomers (TPE), as well as combinations thereof.

Figure 4:
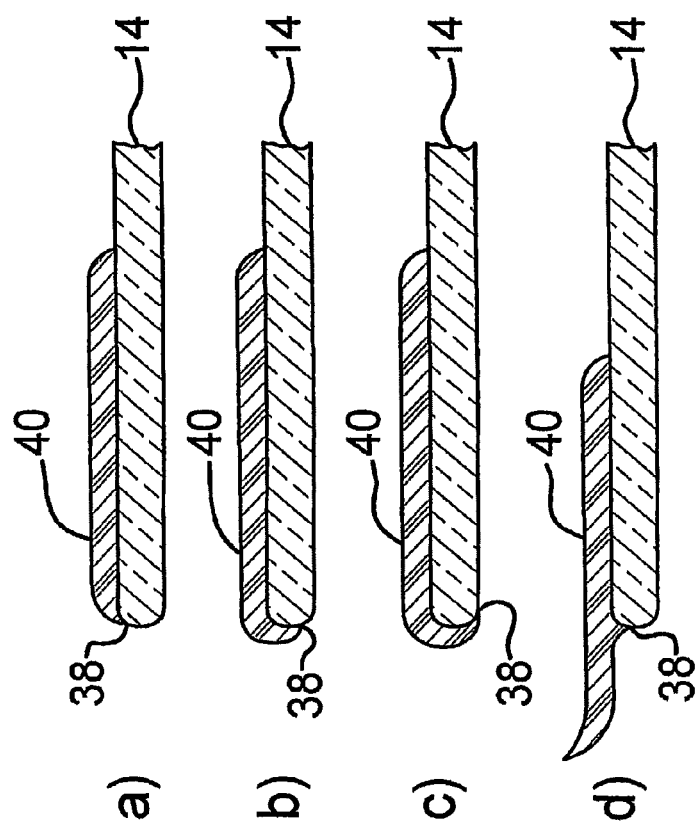
FIG. 4a-d are cross-sectional views of the profiles of representative frames or gaskets which can be molded utilizing the seal and method of the present invention.

Flexible arm 30 and straight arm 32 extend from the intermediate seal portion 28 in different directions from one another, such that straight arm 32 sealingly contacts a major surface 34 of glass sheet 14. By contrast, flexible arm 30, made "flexible" by virtue of an elbow portion, for example, a cut-out 36 or other suitable means, is positioned proximate peripheral edge 38 of glass sheet 14. Under non-molding conditions, flexible arm 30 is not in contact with peripheral edge 38. During molding operations, movable mold portion 20 will urge flexible arm 30 into sealing contact with peripheral edge 38 as illustrated in FIGS. 2 and 3, the direction of movement of the movable mold portion 20 being particularly shown by the arrow. Flexible arm 30 is capable of movement of on the order of 10°-15°. The point at which flexible arm 30 contacts peripheral edge 38 can be adjusted so as to allow the liquid polymeric molding material to bond to varying proportions of the peripheral edge of the glass sheet so as to form different molding profiles, as illustrated in FIG. 4. Movable mold portion 20 is activated upon the closing of upper and lower mold halves 24 and 10. After completion of a molding cycle, the mold halves 24 and 10 are opened, the movable mold portion retracts, thus allowing flexible arm 30 to once again move out of molding contact with peripheral edge 38.

It is within the scope of the invention for mold seal 22, seal cavity 18 and movable mold portion 20 to be present only in selected portions of the periphery of glass sheet 14, as well as to be present around the complete periphery of glass sheet 14 as shown in FIG. 1.

FIG. 4 illustrates some of the versatility of mold seal 22. FIG. 4a shows the capability of molding up to the transition between major surface 40 and peripheral edge 38 of glass sheet 14. FIG. 4b shows how, with adjustment of the position of mold seal 22, molding past the transition point between major surface 40 and peripheral edge 38 to an intermediate position on the edge of the glass sheet can be accomplished. Finally, FIG. 4c shows how the mold seal 22 of the present invention can be utilized to mold a polymeric frame, gasket or the like to form a so-called two-side encapsulation; i.e., a peripheral portion of a major surface and a peripheral edge of a glass sheet.

In accordance with the provisions of the patent statutes, the principles and mode of operation of the present invention have been described in what is considered to represent the preferred embodiment. It should be understood, however, that the invention may be practiced otherwise than as specifically illustrated and described without departing from the scope of the claims herein.

What is claimed is:

1. A molding apparatus comprising:
   upper and lower mold halves, at least one of the upper and lower mold halves having a molding cavity, a seal cavity and at least one movable mold portion formed therein; and
   a dynamic seal comprising a base portion, an intermediate seal portion, a straight arm portion and a flexible arm portion, each arm portion extending from the intermediate seal portion, the base portion being positioned within at least a portion of the seal cavity;
   wherein when a sheet of a substrate material is placed between the upper and lower mold halves, at least a portion of the periphery of the sheet is within the molding cavity proximate the dynamic seal, such that the straight arm portion is in sealing contact with a major surface of the sheet, and the flexible arm portion is proximate at least a portion of the peripheral edge of the sheet of substrate material, and whereby closing the upper and lower mold halves causes the at least one moveable mold portion to contact the flexible arm portion, and sealingly press the flexible arm portion against the peripheral edge of the sheet, and wherein the flexible arm portion is capable of moving in an arc of at least 10°.

2. The molding apparatus defined in claim 1, wherein the seal comprises an integral elbow portion connecting the flexible arm portion to the intermediate seal portion so as to allow movement of the flexible arm portion.

3. The molding apparatus defined in claim 2, wherein the elbow portion is formed by a cut-out in the flexible arm portion.

4. The molding apparatus defined in claim 1, wherein the seal is comprised of an ethylene propylene diene M-class rubber material.

5. The molding apparatus defined in claim 1, wherein the seal is comprised of a silicone material.

6. The molding apparatus defined in claim 1, wherein the flexible arm portion is capable of moving in an arc of 10-15°.

7. A molding apparatus comprising:

upper and lower mold halves, at least one of the upper and lower mold halves having a molding cavity, a seal cavity and at least one movable mold portion formed therein; and a dynamic seal comprising a base portion, an intermediate seal portion, a straight arm portion and a flexible arm portion, each arm portion extending from the intermediate seal portion, the base portion being positioned within at least a portion of the seal cavity;

wherein when a sheet of a substrate material is placed between the upper and lower mold halves, at least a portion of the periphery of the sheet is within the molding cavity proximate the dynamic seal, such that the straight arm portion is in sealing contact with a major surface of the sheet, and the flexible arm portion is proximate at least a portion of the peripheral edge of the sheet of substrate material, and whereby closing the upper and lower mold halves causes the at least one moveable mold portion to move into contact with the flexible arm portion, deflecting the flexible arm portion into sealing engagement with the peripheral edge of the sheet.

8. The molding apparatus defined in claim 7, wherein the flexible arm portion is capable of moving in an arc of at least 10°.

* * * * *